(12) United States Patent
Thom et al.

(10) Patent No.: US 10,320,571 B2
(45) Date of Patent: Jun. 11, 2019

(54) TECHNIQUES FOR AUTHENTICATING DEVICES USING A TRUSTED PLATFORM MODULE DEVICE

(71) Applicant: Microsoft Technology Licensing, LLC, Redmond, WA (US)

(72) Inventors: Stefan Thom, Snohomish, WA (US); Artem Alekseyevich Zhurid, Bellevue, WA (US); Merzin Kapadia, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 113 days.

(21) Appl. No.: 15/274,879

(22) Filed: Sep. 23, 2016

(65) Prior Publication Data
US 2018/0091312 A1    Mar. 29, 2018

(51) Int. Cl.
| | |
|---|---|
| *H04L 29/06* | (2006.01) |
| *H04L 9/32* | (2006.01) |
| *H04L 9/14* | (2006.01) |
| *H04L 9/30* | (2006.01) |
| *G06F 21/33* | (2013.01) |
| *G06F 21/34* | (2013.01) |

(Continued)

(52) U.S. Cl.
CPC ............ *H04L 9/3263* (2013.01); *G06F 21/33* (2013.01); *G06F 21/34* (2013.01); *G06F 21/57* (2013.01); *H04L 9/14* (2013.01); *H04L 9/30* (2013.01); *H04L 9/3234* (2013.01); *H04L 9/3247* (2013.01); *H04L 9/3268* (2013.01); *H04L 63/0823* (2013.01); *H04L 63/0853* (2013.01); *H04W 12/06* (2013.01); *H04L 2209/127* (2013.01)

(58) Field of Classification Search
CPC ....... H04L 9/3263; H04L 9/30; H04L 9/3247; H04L 9/14
See application file for complete search history.

(56) References Cited

U.S. PATENT DOCUMENTS

| | | | | |
|---|---|---|---|---|
| 6,148,405 A | * | 11/2000 | Liao ...................... | H04L 9/3273 380/255 |
| 7,121,460 B1 | * | 10/2006 | Parsons ................ | G06Q 20/341 235/379 |

(Continued)

FOREIGN PATENT DOCUMENTS

| | | |
|---|---|---|
| CN | 202939609 U | 5/2013 |
| CN | 203224878 U | 10/2013 |
| WO | 2005122055 A2 | 12/2005 |

OTHER PUBLICATIONS

"International Search Report and Written Opinion Issued in PCT Application No. PCT/US2017/051244", dated Nov. 22, 2017, 12 Pages.

(Continued)

*Primary Examiner* — David Garcia Cervetti
(74) *Attorney, Agent, or Firm* — Arent Fox LLP

(57) ABSTRACT

Described are examples for authenticating a device including detecting an event related to communications with a trusted platform module (TPM) device, performing, in response to detecting the event, one or more security-related functions with the TPM device, such as generating and/or signing one or more digital certificates, which may be based on one or more keys on the TPM device.

20 Claims, 8 Drawing Sheets

(51) Int. Cl.
*G06F 21/57* (2013.01)
*H04W 12/06* (2009.01)

(56) References Cited

U.S. PATENT DOCUMENTS

| | | | | |
|---|---|---|---|---|
| 7,236,455 | B1* | 6/2007 | Proudler | G06F 21/34 370/230 |
| 7,302,585 | B1* | 11/2007 | Proudler | G06F 21/84 713/189 |
| 7,461,249 | B1* | 12/2008 | Pearson | G06F 21/10 705/59 |
| 7,526,785 | B1* | 4/2009 | Pearson | G06F 21/57 725/31 |
| 8,127,146 | B2* | 2/2012 | Thom | G06F 21/34 713/189 |
| 8,271,783 | B2* | 9/2012 | Ibrahim | G06F 21/57 713/164 |
| 8,522,018 | B2* | 8/2013 | Molina | H04L 63/08 709/203 |
| 9,015,454 | B2 | 4/2015 | Badaoui-Najjar et al. | |
| 9,075,927 | B2 | 7/2015 | Gundam et al. | |
| 9,680,872 | B1* | 6/2017 | Roth | H04L 63/20 |
| 9,736,149 | B2* | 8/2017 | Bettenburg | G06F 17/30879 |
| 9,887,983 | B2* | 2/2018 | Lindemann | H04L 63/0823 |
| 9,935,773 | B2* | 4/2018 | Sarangdhar | H04L 9/0861 |
| 2002/0026576 | A1* | 2/2002 | Das-Purkayastha | G06F 21/552 713/156 |
| 2003/0163700 | A1* | 8/2003 | Paatero | H04L 63/0823 713/175 |
| 2004/0117318 | A1* | 6/2004 | Grawrock | G06F 21/57 705/66 |
| 2004/0177302 | A1* | 9/2004 | Mori | G01R 31/31905 714/738 |
| 2005/0138389 | A1* | 6/2005 | Catherman | G06F 21/34 713/185 |
| 2005/0149733 | A1* | 7/2005 | Catherman | G06F 21/57 713/175 |
| 2005/0166051 | A1* | 7/2005 | Buer | H04L 9/3263 713/173 |
| 2005/0246552 | A1* | 11/2005 | Bade | G06F 21/53 713/193 |
| 2006/0085646 | A1 | 4/2006 | Cutter et al. | |
| 2006/0242405 | A1* | 10/2006 | Gupta | H04L 63/0823 713/156 |
| 2007/0006169 | A1* | 1/2007 | Iliev | G06F 21/57 717/131 |
| 2007/0101138 | A1* | 5/2007 | Camenisch | H04L 9/3234 713/168 |
| 2007/0256125 | A1* | 11/2007 | Chen | G06F 21/33 726/18 |
| 2007/0294744 | A1* | 12/2007 | Alessio | H04L 63/20 726/1 |
| 2008/0046581 | A1* | 2/2008 | Molina | H04L 63/08 709/229 |
| 2008/0046716 | A1* | 2/2008 | Eastlake | H04L 63/0823 713/156 |
| 2008/0130895 | A1* | 6/2008 | Jueneman | H04L 9/3066 380/277 |
| 2009/0132816 | A1* | 5/2009 | Lee | G06F 9/455 713/164 |
| 2009/0271618 | A1* | 10/2009 | Camenisch | G06F 21/445 713/155 |
| 2009/0292919 | A1* | 11/2009 | England | H04L 9/0897 713/168 |
| 2009/0319782 | A1* | 12/2009 | Lee | G06F 21/34 713/156 |
| 2010/0082991 | A1* | 4/2010 | Baldwin | H04L 9/083 713/176 |
| 2010/0235648 | A1* | 9/2010 | Hoang | G06F 21/575 713/189 |
| 2010/0313011 | A1* | 12/2010 | Laffey | H04L 12/6418 713/155 |
| 2010/0318781 | A1* | 12/2010 | Nicolson | G06F 21/575 713/2 |
| 2011/0040961 | A1* | 2/2011 | Badaoui-Najjar | G06F 21/57 713/2 |
| 2011/0087872 | A1* | 4/2011 | Shah | H04L 9/3236 713/2 |
| 2011/0099367 | A1* | 4/2011 | Thom | H04L 9/0877 713/156 |
| 2011/0099627 | A1* | 4/2011 | Proudler | G06F 21/57 726/21 |
| 2011/0154459 | A1* | 6/2011 | Kuang | H04L 63/08 726/6 |
| 2012/0047555 | A1* | 2/2012 | Xiao | G06F 21/445 726/1 |
| 2012/0072731 | A1* | 3/2012 | Winograd | G06F 21/10 713/176 |
| 2012/0233685 | A1* | 9/2012 | Palanigounder | H04W 12/06 726/9 |
| 2013/0073856 | A1* | 3/2013 | Sherkin | H04L 9/006 713/176 |
| 2013/0166907 | A1* | 6/2013 | Brown | H04L 9/3265 713/156 |
| 2013/0276082 | A1* | 10/2013 | Kuang | H04L 63/0869 726/7 |
| 2013/0311784 | A1* | 11/2013 | Bleahen | G06F 21/31 713/185 |
| 2014/0006776 | A1* | 1/2014 | Scott-Nash | G06F 21/57 713/156 |
| 2014/0108784 | A1* | 4/2014 | Pendarakis | H04L 63/062 713/156 |
| 2014/0137178 | A1* | 5/2014 | Thom | G06F 21/6218 726/1 |
| 2014/0196127 | A1* | 7/2014 | Smeets | H04L 63/0815 726/5 |
| 2014/0365763 | A1* | 12/2014 | Manohar | H04L 9/3263 713/156 |
| 2014/0373184 | A1* | 12/2014 | Mahaffey | G06F 21/88 726/35 |
| 2015/0138716 | A1* | 5/2015 | Herman | G06F 1/181 361/679.32 |
| 2015/0172292 | A1* | 6/2015 | Kuang | H04L 63/0884 713/155 |
| 2015/0215339 | A1* | 7/2015 | Chernoguzov | H04L 63/06 726/1 |
| 2015/0222612 | A1* | 8/2015 | Norp | H04W 76/14 726/4 |
| 2015/0227753 | A1* | 8/2015 | Callaghan | G06F 21/6218 713/165 |
| 2015/0319160 | A1* | 11/2015 | Ferguson | H04L 9/0894 726/10 |
| 2016/0050071 | A1* | 2/2016 | Collart | G06F 21/57 713/193 |
| 2016/0088464 | A1* | 3/2016 | Hans | H04W 8/183 455/558 |
| 2016/0142212 | A1* | 5/2016 | Sarangdhar | H04L 9/0861 713/156 |
| 2016/0226657 | A1* | 8/2016 | Thom | H04L 9/3234 |
| 2016/0226833 | A1* | 8/2016 | Dawson | H04L 63/0428 |
| 2016/0330193 | A1* | 11/2016 | Singh | H04L 63/0823 |
| 2016/0365984 | A1* | 12/2016 | Lee | H04L 9/3247 |
| 2017/0019396 | A1* | 1/2017 | Bettenburg | G06F 17/30879 |
| 2017/0054566 | A1* | 2/2017 | Nitschke | H04L 9/3265 |
| 2017/0140130 | A1* | 5/2017 | Thom | G06F 21/10 |
| 2017/0140146 | A1* | 5/2017 | Mehta | G06F 21/45 |
| 2017/0300674 | A1* | 10/2017 | Simske | G02F 1/167 |
| 2017/0302459 | A1* | 10/2017 | Fenner | G06F 19/00 |
| 2017/0317830 | A1* | 11/2017 | Simske | G09G 3/344 |
| 2017/0353435 | A1* | 12/2017 | Pritikin | G06Q 30/018 |

OTHER PUBLICATIONS

"ISO/IEC 11889-1:2015(E)—Trusted Platform Module Library—Part 1: Architecture (Corrected version from Jan. 4, 2016)", Retrieved at: <<https://www.iso.org/standard/66510.html>>, Apr. 1, 2016, 277 Pages.

(56) References Cited

OTHER PUBLICATIONS

Diallo, Amadou, "Google Opens Path to Password-Free Future", Published on: Oct. 21, 2014 Available at: http://www.forbes.com/sites/amadoudiallo/2014/10/21/google-opens-path-to-password-free-future/#5f1b4c9c2d10.

Lee, Micah, "Encrypting Your Laptop Like You Mean It", Published on: Apr. 27, 2015 Available at: https://theintercept.com/2015/04/27/encrypting-laptop-like-mean/https:/theintercept.com/2015/04/27/encrypting-laptop-like-mean/https:/theintercept.com/2015/04/27/encrypting-laptop-like-mean/.

Brink, "How to Turn On or Off BitLocker for Operating System Drive in Windows 10", Published on: Jan. 11, 2016 Available at: http://www.tenforums.com/tutorials/37060-bitlocker-turn-off-operating-system-drive-windows-10-a.html.

"Data Security Has Never Been This Easy", Retrieved on: Aug. 10, 2016 Available at: http://www.gigabyte.com/MicroSite/44/tech_080818_ultratpm_main.htm.

Zhang, et al., "A Portable TPM Based on USB Key", In Proceedings of the 17th ACM conference on Computer and communications security, Oct. 4, 2010, pp. 750-752.

"Gigabyte's Ultra TPM Explained", Retrieved on: Aug. 10, 2016 Available at: http://www.gigabyte.com/webpage/14/article_10_ultra_tpm.htm.

\* cited by examiner

TECHNIQUES FOR AUTHENTICATING DEVICES USING A TRUSTED PLATFORM MODULE DEVICE

BACKGROUND

Many computing devices employ trusted platform modules (TPM) in the form of a secure cryptoprocessor for providing hardware-based security-related functions. The TPM is typically a cryptoprocessor chip integrated into the device via low pin count (LPC) interface, a serial peripheral interface (SPI), or an inter-integrated circuit (I2C) bus, and soldered to the printed circuit board (PCB). The computing device uses the cryptoprocessor chip to create security keys (e.g., Rivest, Shamir, Adleman (RSA) private keys) for the device, among other operations, which can be specific to hardware in the device to prevent unauthorized replication and use of the security keys by other devices.

In some applications, a certificate authority can create digital certificates that a device can use in communicating with one or more other devices in a network by providing the digital certificate(s) to prove authentication to the one or more other devices. For example, the one or more other devices may include a router or other component for accessing a WiFi network. In such applications, the device can use the TPM to generate one or more keys to sign the digital certificate. This allows the one or more other devices receiving the digital certificate to ensure the digital certificate is received from a trusted source, e.g., based on verifying the one or more keys used to sign the digital certificate.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a device is provided including a memory storing one or more parameters or instructions for executing a certificate authority service, an interface configured to communicate with a removably connectable trusted platform module (TPM) device, and at least one processor coupled to the memory and the interface. The at least one processor is configured to detect an event corresponding to communications with the TPM device via the interface, execute the certificate authority service to generate, in response to detecting the event, a digital certificate for authenticating the device, sign the digital certificate using the TPM device, and transmit the digital certificate to authenticate the device in communicating with one or more other devices.

In another example, a method for authenticating a device is provided. The method includes detecting an event related to communications with a removably connectable TPM device, executing a certificate authority service to generate, in response to detecting the event, a digital certificate, signing the digital certificate using the TPM device, and transmitting the digital certificate, as signed, to one or more other devices to authenticate communication with the one or more other devices.

In another example, a non-transitory computer-readable medium including code for authenticating a device is provided. The code includes code for detecting an event related to communications with a TPM device, code for executing a certificate authority service to generate, in response to detecting the event, a digital certificate, code for signing the digital certificate using the TPM device, and code for transmitting the digital certificate, as signed, to one or more other devices to authenticate communication with the one or more other devices.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to a device having an interface for communicating with a separate (e.g., non-integrated; independent; remote), removably connectable trusted platform module (TPM) device for performing security-related functions at the device. For example, the security-related functions may include signing digital certificates created for the device to associate the digital certificates with a trusted source. The TPM device can be a separate device with a memory for storing one or more keys that can be used to perform the security-related functions for one or more devices. For example, the TPM device can communicate with the device using a wired interface, such as but not limited to a universal serial bus (USB) interface, a Firewire interface, etc., and/or a wireless interface, such as but not limited to a Bluetooth interface, a near field communications (NFC) interface, etc., in performing the security related functions.

Additionally, for example, the device may include a certificate authority (CA) service for generating one or more digital certificates that the device can utilize to provide authentication in communicating with one or more other devices. The device can utilize the TPM device, in an example, to sign the digital certificate(s) with one or more keys (e.g., one or more private keys) such that the one or more other devices receiving the digital certificate(s) can verify the digital certificate using one or more corresponding keys (e.g., one or more public keys) to determine whether the digital certificate(s) are associated with a trusted source. If so, the one or more other devices may authenticate the device based on the signed digital certificate(s). In this regard, the device does not need to include the TPM, instead, the device can include the CA service that can operate (and/or can be activated) based on coupling the TPM device with the device.

Figure 1:
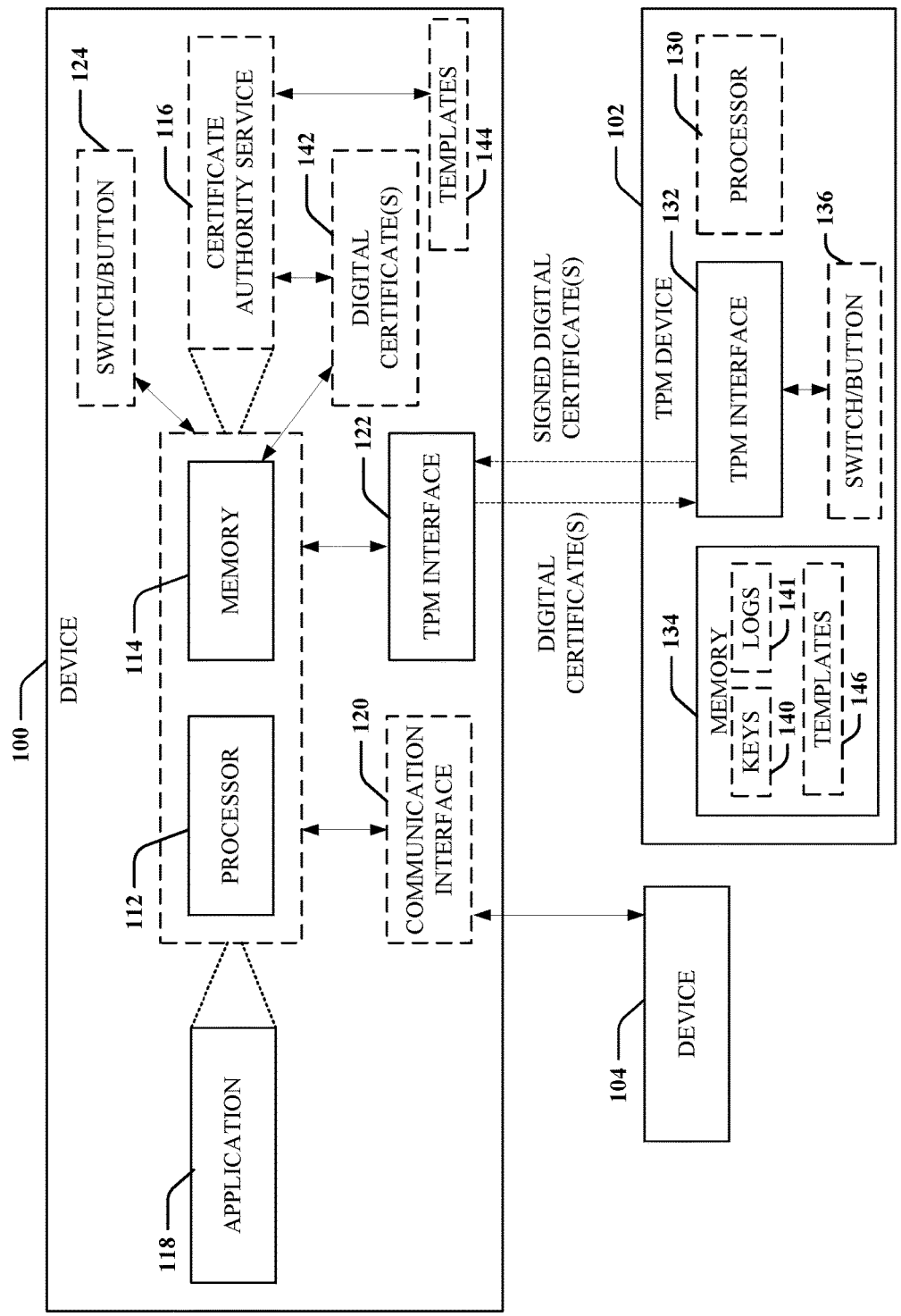
FIG. 1 is a schematic diagram of an example of a system for performing one or more security-related functions for a device based on a trusted platform module (TPM) device.
Figure 2:
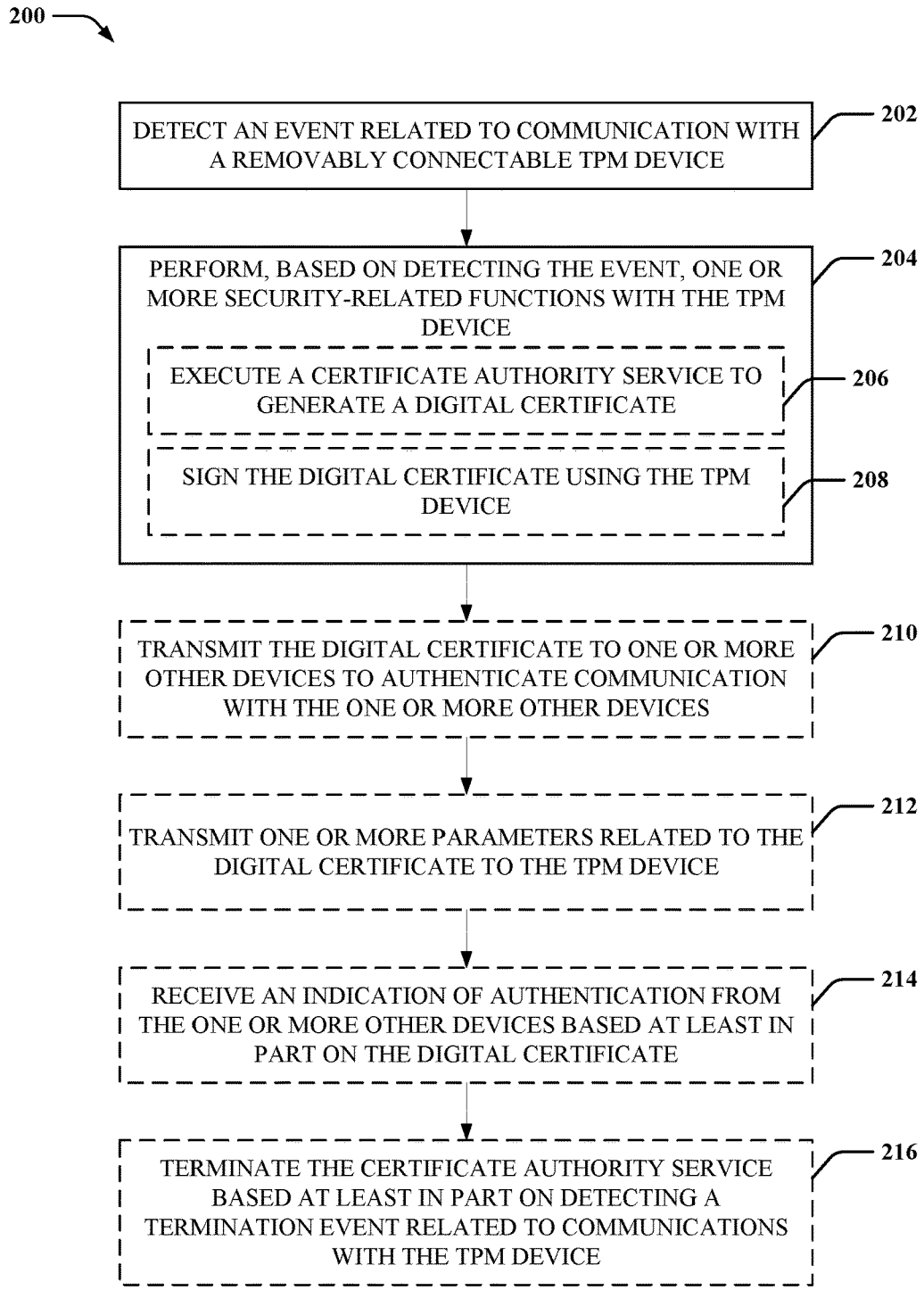
FIG. 2 is a flow diagram of an example of a method for performing one or more security-related functions for a device based on a TPM device.
Figure 3:
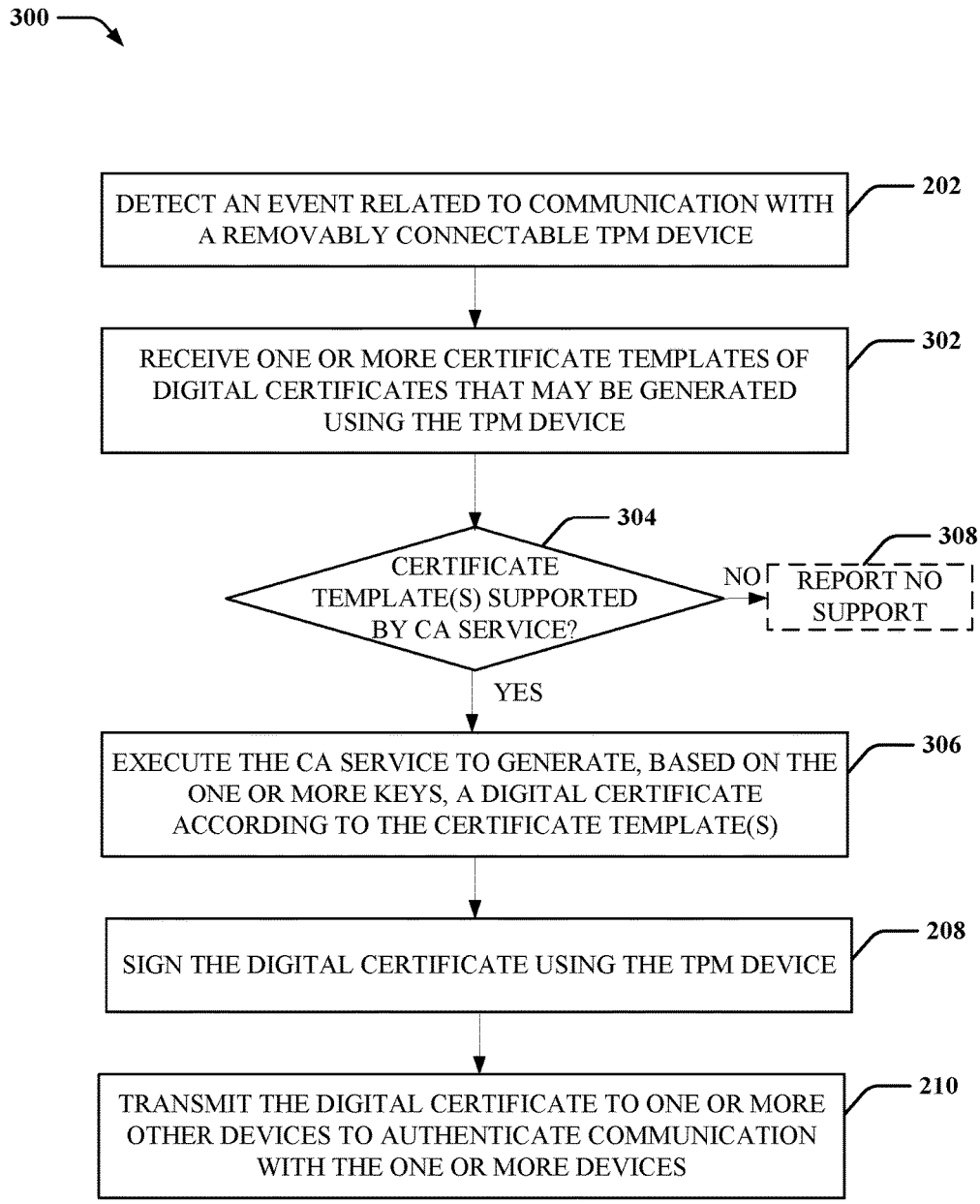
FIG. 3 is a flow diagram of an example of a method for providing a digital certificate for a device based on a TPM device using one or more certificate templates.

Turning now to FIGS. 1-3, examples are depicted with reference to one or more components and one or more methods that may perform the actions or operations described herein, where components and/or actions/operations in dashed line may be optional. Although the operations described below in FIGS. 2 and 3 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a device 100 that can communicate with a separate (e.g., non-integrated; independent; remote), removably connectable TPM device 102 for performing one or more security-related functions. Device 100 can also communicate with another device 104 and authenticate communications therewith based on performing the one or more security-related functions via the TPM device 102. In an example, device 100 can include a processor 112 and/or memory 114 configured to execute or store instructions or other parameters related to performing the one or more security-related functions, such as executing a CA service 116 for generating one or more digital certificates 142 for the device 100, and/or executing an application 118, which can authenticate device 100 with one or more other devices 104 using digital certificate 142. For example, the application 118 may include substantially any application for communicating with another device 104 based on using a certificate for authenticated communications, such as a cloud-based services application for communicating with one or more cloud-based services or related network nodes over a network, a web browser used to provide one or more certificates to another device 104 for communicating therewith using one or more network connections or protocols, etc.

Device 100 may also include a communication interface 120 for communicating with the one or more other devices 104. In an example, communication interface 120 can include a wired interface such as a wired connection to a local area network (LAN) with which the one or more other devices 104 are associated, a serial or parallel wired interface, such as a universal serial bus (USB), Firewire, etc. with the one or more devices 104. In another example, communication interface 120 can include a wireless interface, such as a wireless connection to a wireless (LAN) (e.g., via WiFi), a cellular network, etc. with which the one or more other devices 104 are associated, a Bluetooth, near field communication (NFC), etc. connection with the one or more other devices 104, and/or the like.

Device 100 can additionally include a TPM interface 122 for communicatively coupling a TPM device 102 to the device 100. For example, the TPM interface 122 can include or be coupled with a wired interface (e.g., USB, Firewire, or other serial or parallel interface), a wireless interface (e.g., Bluetooth, NFC, etc.), and/or the like. The TPM device 102 can similarly include a TPM interface 132 for coupling with the TPM interface 122 of device 100, where the TPM interface 132 can similarly include or be coupled with a wired interface (e.g., USB, Firewire, or other serial or parallel interface), a wireless interface (e.g., Bluetooth, NFC, etc.), and/or the like. In some instances, the TPM device 102 can be a passive device, without an independent processor, that is activated and controlled by a processor 112 of device 100 when the TPM device 102 is coupled, via TPM interface 132, to TPM interface 122 of the device 100. In another example, TPM device 102 can be an active device, having an independent processor 130, such that coupling to the device 100 can be via a pairing process between TPM interface 122 and TPM interface 132 (e.g., a Bluetooth pairing process, NFC handshake, etc.). In one example, processor 130 may be or may include a TPM for generating the one or more keys 140 based at least in part on hardware information related to TPM device 102.

In either case, TPM device 102 can include a memory 134 for optionally (as indicated by dashed lines) storing one or more keys 140 that can be used to perform security-related functions at one or more devices that receive the TPM device 102. In addition, for example, memory 134 can store one or more logs 141 including one or more parameters related to the one or more digital certificates 142 signed by the TPM device 102 (e.g., contents or a copy of the digital certificates 142, a serial number associated with the digital certificates 142, etc. In an example, memory 134 may be a protected or otherwise encrypted memory such that the contents thereof can be encrypted upon storing, and decrypted when retrieved. Moreover, for example, the one or more keys 140 can include, but are not limited to, one or more Rivest, Shamir, Adleman (RSA) keys, which may be private or public keys. In a specific example, described further herein, insertion of the TPM device 102 into the device 100, or pairing of the TPM device 102 with the device 100, can be an event detected by the device 100. The device 100 (or a component thereof) can perform one or more security-related functions via the TPM device 102 based on the detected event.

In one specific example, CA service 116 can generate one or more digital certificates 142, which can be stored in memory 114, for authenticating device 100 to another device 104, e.g., for establishing and/or maintaining communications. In this example, TPM interface 122 can access TPM device 102 for performing one or more security-related functions, such as signing the digital certificate(s) 142. In this example, TPM interface 122 (e.g., based on detecting the event) can provide the digital certificate(s) 142 to TPM device 102 for signing with the one or more keys 140 to associate a trusted source with the one or more digital certificates 142. Device 100 (e.g., via application 118) can then transmit the one or more digital certificates 142 (e.g., from memory 114), as signed using the one or more keys 140, to the other device 104. Device 104 can verify that the digital certificate(s) 142 are from a trusted source based on verifying the one or more keys used to sign the digital certificate(s) 142. For example, device 104 may attempt to decode the digital certificate(s) 142 using one or more corresponding public keys. Device 104 can accordingly authenticate the device 100 based on the digital certificate(s) 142 where the digital certificate(s) 142 are determined as associated with the trusted source.

In one example, CA service 116 can operate to generate and sign digital certificate(s) 142 based on whether the TPM device 102 is coupled to the device 100 (e.g., CA service 116 can be activated when the TPM device 102 is coupled to device 100 and can be deactivated with the TPM device 102 is not coupled to device 100) and/or based on whether or when the one or more keys 140 are obtained from the TPM device 102. In another example, device 100 can include a type of switch, such as a mechanical, electro-mechanical, or virtual button, which may include switch/button 124, activation of which can cause generation of one or more digital certificates 142. In yet another example, TPM device 102 can include a switch/button 136 (e.g., a mechanical, electro-mechanical, or virtual button) for approving generation and/or signing of the one or more digital certificates 142. In additional examples described further herein, the TPM device 102 and/or CA service 116 may also include one or more certificate templates 144, 146 indicating the types of certificates that can and/or should be generated by CA service 116 and/or signed by one or more keys from TPM device 102. For example, the CA templates 144, 146 may include a list of settings, parameters, etc. that can be specific for certain types of templates; thus similar digital certificates can be generate based on a CA template.

In either case, in this regard, device 100 does not need an integrated TPM to sign the digital certificate(s) 142 such to associate the digital certificate(s) 142 with a trusted source. Thus, a user can indicate a trust relationship with the device 100 by inserting the TPM device 102 into device 100 to allow for signing of the digital certificate(s) 142 via one or more keys 140 in the TPM device 102 (and/or to allow generation of the digital certificate(s) 142 in the first place).

Thus, the device 100 described herein may allow a user to easily and efficiently authenticate the user-owned device (e.g., device 100) with any other device via use of a user-owned or user-accessible TPM device 102. For instance, in some example use cases, the user may simply and easily authenticate a new user device to other devices on a network, such as but not limited to authenticating user-owned Internet of Things (IoT) devices to one another so that they can communicate on a network, authenticating a device to an access network (e.g., to a WiFi router), and authenticating a device to access cloud-based services. The aspects described herein can enable a user to perform such authentication without reliance on complicated and potentially inaccessible network-based certificate authorities.

In an example, device 100 can include substantially any device that may or may not have input and/or output components. For example, device 100 can include a computer, a server, a personal device, such as a cellular phone, smart phone, tablet, etc., a home appliance (e.g., a refrigerator, oven, toaster, washer, dryer, security system, etc.). In an example, device 100 can be substantially any device that can connect to a home network (e.g., a WLAN) to communicate with one or more devices on the home network, cloud-based services devices, etc., which can include device 104. Similarly, device 104 can be similar to one or more of the above listed examples for device 100 and may communicate with device 100 over a network or direct connection thereto, as described. In one example, device 104 may be a TPM device, as described in further detail herein.

Additionally, in an example, TPM device 102 may include a USB/Firewire key device, a Bluetooth or NFC enabled fob device, or substantially any device that can include at least a non-volatile (and, preferably protected) memory for storing the one or more keys 140 and an interface for allowing a device (e.g., device 100) to engage the TPM device 102 for performing one or more security-related functions.

FIG. 2 is a flowchart of an example of a method 200 for performing security-related functions for a device. For example, method 200 can be performed by a device 100 and/or one or more components thereof to facilitate performing security-related functions at device 100 based on coupling with a TPM device 102.

In method 200, at action 202, an event related to communication with a removably connectable TPM device can be detected. In an example, TPM interface 122, e.g., in conjunction with processor 112, memory 114, etc., can detect an event related to communication with a separate (e.g., non-integrated; independent; remote), removably connectable TPM device 102. For example, TPM interface 122 may detect the event as a coupling of TPM device 102 to device 100, which may include detecting physical attachment of the TPM device 102 to device 100 (e.g., an event related to plugging the TPM device 102 into a USB/Firewire port of device 100), detecting a pairing of the TPM device 102 with device 100 (e.g., an event related to a Bluetooth pairing, NFC handshake, etc.), discovery of the memory 134 of the TPM device 102 as a storage device, and/or the like. For example, TPM interface 122 may detect the event based on receiving a notification of the coupling of TPM device 102 to device 100 from an operating system executing on the device 100.

In another example, TPM interface 122, e.g., in conjunction with processor 112, memory 114, may detect the event based on a communication received from the TPM device 102, such as a message sent to device 100 via TPM interfaces 132, 122 (e.g., a message after TPM device 102 is attached to or paired with device 100). Furthermore, in an example, TPM interface 122 may detect the event as a notification from the application 118 to perform one or more security-related functions with the TPM device 102. Moreover, for example, TPM interface 122 may detect the event as or based on activation of a switch/button 124 on the device 100, or switch/button 136 on TPM device 102, for the purpose of causing the device 100 to perform the one or more security-related functions (e.g., provisioning on a home network), accepting or causing generation of one or more digital certificates 142, etc. In this example, the switch/button 124 may be communicatively coupled to the TPM interface 122 (e.g., via processor 112, as shown, via a direct connection, etc.), and detecting activation of the switch/button 124 (e.g., by being pressed by a force, such as user touch) may be the detected event for causing one or more of the functions described below. Alternatively (or in addition), the switch/button 136 may be communicatively coupled to the TPM interface 132, and detecting activation of the switch/button 136 (e.g., via communication of the event through TPM interface 132, 122 communication) may be the detected event for causing one or more of the functions described below.

In method 200, at action 204, one or more security-related functions can be performed with the TPM device based on detecting the event. In an example, TPM interface 122, e.g., in conjunction with processor 112, memory 114, etc., can perform, based on (e.g., in response to) detecting the event, the one or more security-related functions with the TPM device 102. As described, the one or more security-related functions can include associating one or more digital components (e.g., digital certificates) with a trusted source using one or more keys 140. For example, the one or more digital components can be signed with the one or more keys 140, which can correspond to RSA private keys or other security keys, secrets, credentials, etc., to associate the digital components with the trusted source.

In an example, TPM device 102 can store the one or more keys 140 in memory 134. TPM interface 122 can receive a notification of the event related to the communication with the TPM device 102, as described above (e.g., an event detected via TPM interface 122, by an operating system executing on device 100, by application 118, by activation of a switch/button 124, 136, etc.), in an example, and can accordingly perform one or more security-related functions with TPM device 102. In one specific example, performing the one or more security-related functions at action 204 may optionally (as indicated by dashed lines) include, at action 206, executing a CA service to generate a digital certificate, and at action 208, signing the digital certificate using the TPM device. In an example, TPM interface 122, e.g., in conjunction with processor 112, memory 114, etc., can execute the CA service 116 to generate a digital certificate 142, and CA service 116 can sign the digital certificate 142 using the TPM device 102 (e.g., by engaging TPM device 102 via TPM interface 122). For example, CA service 116 may generate the digital certificate 142 and provide the digital certificate 142 to the TPM device 102 via communication between TPM interfaces 122, 132. TPM device 102 can sign the digital certificate 142 and return the signed digital certificate 142 to device 100, which device 100 can store in memory 114, use in performing authentication, etc., as described.

For example, in this regard, CA service 116 may execute or cause execution of a signing function on the TPM device 102 to sign the digital certificate 142 using the one or more keys 140 as part of operating as a CA. In one example, device 100 may mount TPM device 102 as a device storage volume (e.g., via an operating system executing on the device 100), and TPM interface 122 can accordingly detect one or more security-related functions that can be performed by or in conjunction with TPM device 102 based on the mounting. For instance, in this regard, TPM device 102 may expose itself as a generic smart card reader or other type of device to device 100, where the TPM device 102 can include a permanently inserted smart card in the form of memory 134 that stores the one or more keys 140 and/or functions for signing a digital component using the one or more keys 140. In another example, a Bluetooth or NFC communication in a wireless communication session between the TPM device 102 and device 100 can include an indication of the one or more security-related functions that can be performed via TPM device 102. In any case, CA service 116 may not store keys to be used in signing generated digital certificates 142, but instead may rely on the separate and independent TPM device 102 to store/generate the keys 140 and accordingly sign the digital certificates 142 or perform the other security-related functions.

In a specific example, which should not be construed as limiting, CA service 116 can generate a X.509 digital certificate for the device 100, and can sign the X.509 digital certificate using the TPM device 102. For example, the CA service 116 may generate the X.509 certificate based on detecting the event related to communicating with TPM device 102. Instructions for executing the CA service 116 can be stored in memory 114, and processor 112 can execute the CA service 116 according to the instructions to generate the X.509 certificate based on the TPM device 102 being coupled to the device 100 and/or based on receiving the one or more keys 140 from the TPM device 102. CA service 116 can utilize TPM device 102 sign the X.509 certificate with the one or more keys 140. In one example, CA service 116 may provide the X.509 certificate to the TPM device 102, TPM device 102 can sign the X.509 certificate using the one or more keys 140, and TPM device 102 can provide the signed X.509 certificate to the device 100 in response to the request. Thus, for example, CA service 116 can become a full CA having both the TPM portion and associated keys for signing the certificates when device 100 is coupled with the TPM device 102.

In addition, for example, CA service 116 may attempt to detect another event before generating the digital certificate 142 and/or signing the digital certificate 142 with the TPM device 102, such as an approval indicated on the device 100 (e.g., by a user). For example, the device 100 may include a switch/button 124 (and/or TPM device 102 may include switch/button 136), as described, activation (e.g., physical pressing or touching, such as by a user) of which can additionally cause CA service 116 to generate and/or sign the digital certificate 142 (e.g., in conjunction with detecting coupling of the TPM device 102 to device 100). In another example, device 100 and/or TPM device 102 may include a display (not shown) that may display a prompt to approve generation of the digital certificate 142 and/or the signing thereof (e.g., where activation of the switch/button 124, and/or switch/button 136, may be used to approve generation/signing of the digital certificate 142). For example, the display may include an LCD or LED screen to display information regarding the digital certificate 142 (e.g., a service requesting the certificate), etc., or a more simple display, such as an indicator light, etc. In an example, CA service 116 may generate and sign multiple digital certificates 142 for multiple devices 104 or related services (e.g., according to one or more certificate templates, as further described below). In this example, CA service 116 can attempt to detect the additional event to approve generation/signing of one or more of the multiple digital certificates 142 before generating/signing of the digital certificates. This can occur according to a key authorization policy to control how many certificates are generated/signed for the individual device 100 and/or by TPM device 102.

In method 200, at optional action 210 where the one or more security-related functions relate to signing the digital certificate, the digital certificate can be transmitted to one or more other devices to authenticate communication with the one or more other devices. In an example, application 118, e.g., in conjunction with processor 112, memory 114, communication interface 120, etc., can transmit the digital certificate to the one or more other devices, such as device 104, which may be a remotely located (e.g., across a wired and/or wireless network) device, to authenticate communication with the one or more other devices, e.g., device 104.

For example, device 100 can initiate communications with the one or more other devices, e.g., device 104, and can provide the signed digital certificate 142 thereto. The one or more other devices, e.g., device 104, can determine that the digital certificate 142 is from a trusted source based on the one or more keys 140 used to sign the digital certificate 142 (e.g., based on applying a public key corresponding to the one or more private keys 140 in an attempt to decode the digital certificate 142, where successful decoding can indicate that the digital certificate 142 is signed by the trusted source).

The one or more other devices, e.g., device 104, can also utilize the digital certificate 142 to authenticate the device 100 for communications with the one or more devices, e.g., device 104. In one example, the one or more devices, e.g., device 104, can include a WiFi or other network router that can utilize the digital certificate 142 to authenticate the device 100 for allowing access to a network and/or related network devices via the router. Thus, for example, device 100 attempting to onboard onto the network associated with the network router can generate and sign the digital certificate 142, as described, and transmit the digital certificate 142 to the network router to request access to onboard on the network. In an example, the other device 104 (e.g., WiFi router) can include a CA service 116 for generating a digital certificate based on coupling with TPM device 102. In this example, the other device 104 can authenticate the device 100 where the other device 104 determines that the digital certificate of device 100 is associated with (e.g., signed by one or more keys from) the same TPM device 102.

In one specific example, device 100 can perform the onboarding process based on at least one of an initial powering or booting of the device 100 (e.g., of hardware, software, or firmware of device 100 to execute application 118, execution of application 118 itself, etc.), an association of device 100 with the TPM device 102, a detection of TPM device 102 as a mounted device storage volume on device 100, etc. For example, based on coupling device 100 to the TPM device 102, activation of switch/button 124, etc., CA service 116 can be executed to generate one or more digital certificates 142 for onboarding onto the network. CA service 116 can sign the one or more digital certificates 142 using the TPM device 102, and application 118 can transmit the one or more digital certificates 142, as signed, to the network router in an attempt to onboard onto the network. Thus, the process of onboarding in this regard may be substantially automated, which may be beneficial for devices that do not have a rich user input mechanism, such as home appliances or other small devices. In addition, trust secrets need not be exchanged over the network as the digital certificates 142 are generated and signed by the device 100. Accordingly, for example, this process may begin based on inserting TPM device 102, and device 100 can automatically perform one or more of the actions described in method 200 based on insertion of the TPM device 102 to generate and sign the digital certificate(s) 124, and transmit the digital certificate(s) 124 to the one or more other devices 104. Moreover, in one example, application 118 can transmit the one or more digital certificates 142 after the CA service 116 is terminated (e.g., based on decoupling TPM device 102 from device 100 or other event), as described in further detail below.

In another specific example, device 104 can be another TPM device. In this example, device 104 can receive the digital certificate 142 from device 100. Device 104 can subsequently provide the digital certificate 142 to a CA service 116 of a different device 100 (not shown), or of device 100, for utilizing (e.g., as a root certificate) in generating the digital certificate. Thus, the digital certificate generated based on digital certificate 142 can be associated to the TPM device 102 as an initial trusted source. This is described in further reference to FIG. 7, below.

In method 200, at optional action 212, one or more parameters related to the digital certificate can be transmitted to the TPM device. In an example, CA service 116, e.g., in conjunction with processor 112, memory 114, etc., can transmit the one or more parameters related to the digital certificate 142 to the TPM device 102. For example, the one or more parameters may include a hash value or other parameter related to the digital certificate 142, the one or more keys 140 used to sign the digital certificate 142, etc. In this regard, memory 134 of TPM device 102 can also be used to log the one or more digital certificates 142 signed by the TPM device 102, the one or more keys 140 used to sign the digital certificates 142, etc. in logs 141. For example, the values related to the digital certificates 142 issued by TPM device 102 can be obtained from the logs 141 and used to generate certificate revocation lists that can be published from a file share or cloud-based services node (e.g., a server) to allow the one or more devices 104 to revoke a digital certificate to prevent authentication of the device 100.

In method 200, at optional action 214, an indication of authentication can be received from the one or more devices based at least in part on the digital certificate. In an example, communication interface 120, e.g., in conjunction with processor 112, memory 114, etc., can receive the indication of authentication from the one or more devices 104 based at least in part on the digital certificate 142. In one example, as described further herein, the digital certificate 142 can correspond to a service offered by device 104, and the indication of authentication can correspond to authentication for the service with device 104. In an example, the one or more devices 104 can receive the digital certificate 142 from device 100, can attempt to decode the digital certificate 142 based on one or more public keys (corresponding to one or more private keys used to sign the digital certificate 142), and can authenticate the device based on the digital certificate 142 where the digital certificate 142 is successfully decoded. For example, device 100 (e.g., via application 118) can perform one or more other actions based on receiving the indication of authentication, such as establishing a connection with another device via the one or more devices 104. For example, device 100 may attempt to communicate with a cloud-based services device via the one or more devices 104 to obtain information related to operating device 100 (e.g., to obtain access to a profile of a user of device 100, to obtain updated software for device 100, etc.).

In method 200, at optional action 216, the certificate authority service can be terminated based at least in part on detecting a termination event related to communications with the TPM device. In an example, TPM interface 122, e.g., in conjunction with processor 112, memory 114, etc., can terminate the CA service 116 based at least in part on detecting a termination event related to communications with the TPM device 102. For example, the TPM device 102 can be decoupled from device 100 (e.g., TPM device 102 can unplug from the device 100, can terminate a pairing with device 100, etc.), based on which the CA service 116 can be terminated such that additional digital certificates 142 are not generated until another TPM device 102 is coupled with device 100. Thus, CA service 116 can execute when a TPM device 102 is coupled with device 100 to provide one or more keys 140 thereto for signing the digital certificates 142. In another example, CA service 116 can indicate termination of the CA service 116 (e.g., once one or more digital certificates 142 have been created), at which time the TPM device 102 can be removed from device 100. For example, CA service 116 may indicate termination of the CA service 116 on a display or other visual indication (e.g., an indicator light) of device 100.

FIG. 3 is a flowchart of an example of a method 300 for authenticating a device in communicating with one or more other devices based on one or more certificate templates. For example, method 300 can be performed by a device 100 and/or one or more components thereof to facilitate generating, based on one or more obtained keys, signed digital certificates based on one or more certificate templates for authenticating the device 100.

Method 300 can include action 202, as described above, where an event related to communication with a removably connectable TPM device is detected. Additionally, in method 300 at action 302, one or more certificate templates of digital certificates that may be generated using the TPM device can be received. In an example, TPM interface 122, e.g., in conjunction with processor 112, memory 114, etc., can receive the one or more certificate templates of digital certificates that may be generated using the TPM device 102. For example, TPM interface 122 may receive the one or more certificate templates as stored in memory 134 of TPM device 102. In another example, TPM interface 122 may determine the one or more certificate templates based on one or more parameters related to the TPM device 102 (e.g., a type of the TPM device, etc.). In yet another example, the one or more certificate templates may be indicated by the CA service 116. In an example, the one or more certificate templates can define a format and/or content of digital certificates that can be generated using the TPM device 102. The one or more certificate templates can correspond to a service provided by one or more devices, such as device 104 (e.g., WiFi onboarding, communication with certain services offered by certain network components in a network, etc.).

In method 300, at action 304, it can be determined whether the one or more certificate templates are supported by the CA service. In an example, CA service 116, e.g., in conjunction with processor 112, memory 114, etc., can determine whether the one or more certificate templates associated with TPM device 102 are supported by the CA service 116. For example, CA service 116 can compare a list of certificate templates 146 supported by TPM device 102, as received from memory 134 for example, to a list of certificate templates 144 supported by CA service 116 (e.g., based on a list stored in memory 114 or otherwise obtainable from or based on CA service 116) to determine one or more certificate templates common to both lists.

Where certificate templates of the TPM device 102 are supported by the CA service 116 at action 304, the CA service 116 can be executed to generate, based on the one or more keys, a digital certificate according to the certificate template(s) at action 306. In an example, TPM interface 122, e.g., in conjunction with processor 112, memory 114, etc., can execute the CA service 116 to generate, based on the one or more keys 140, a digital certificate 142 (e.g., one or more digital certificate(s) 142) according to one or more of the certificate templates determined to be supported by the CA service 116. For example, TPM interface 122 can further determine a desired digital certificate based on one or more parameters of the one or more other devices 104 or associated services, which may be received from application 118, and may generate the associated digital certificate. In other examples, CA service 116 can generate one or more digital certificates 142 for each certificate template.

In addition, method 300 can include action 208, as described above, where the digital certificate is signed using the TPM device. Additionally, method 300 can include action 210, as described above, where the digital certificate is transmitted to one or more other devices to authenticate communication with the one or more devices. If the one or more certificate template(s) are determined to not be supported by the CA service at action 304, no support can be reported at 308 and/or method 300 can otherwise terminate. For example, CA service 116, TPM interface 122, etc. can report that the certificate template(s) are not supported (e.g., to application 118), which may include returning an error code to the application 118, terminating the CA service 116, and/or the like.

Figure 4:
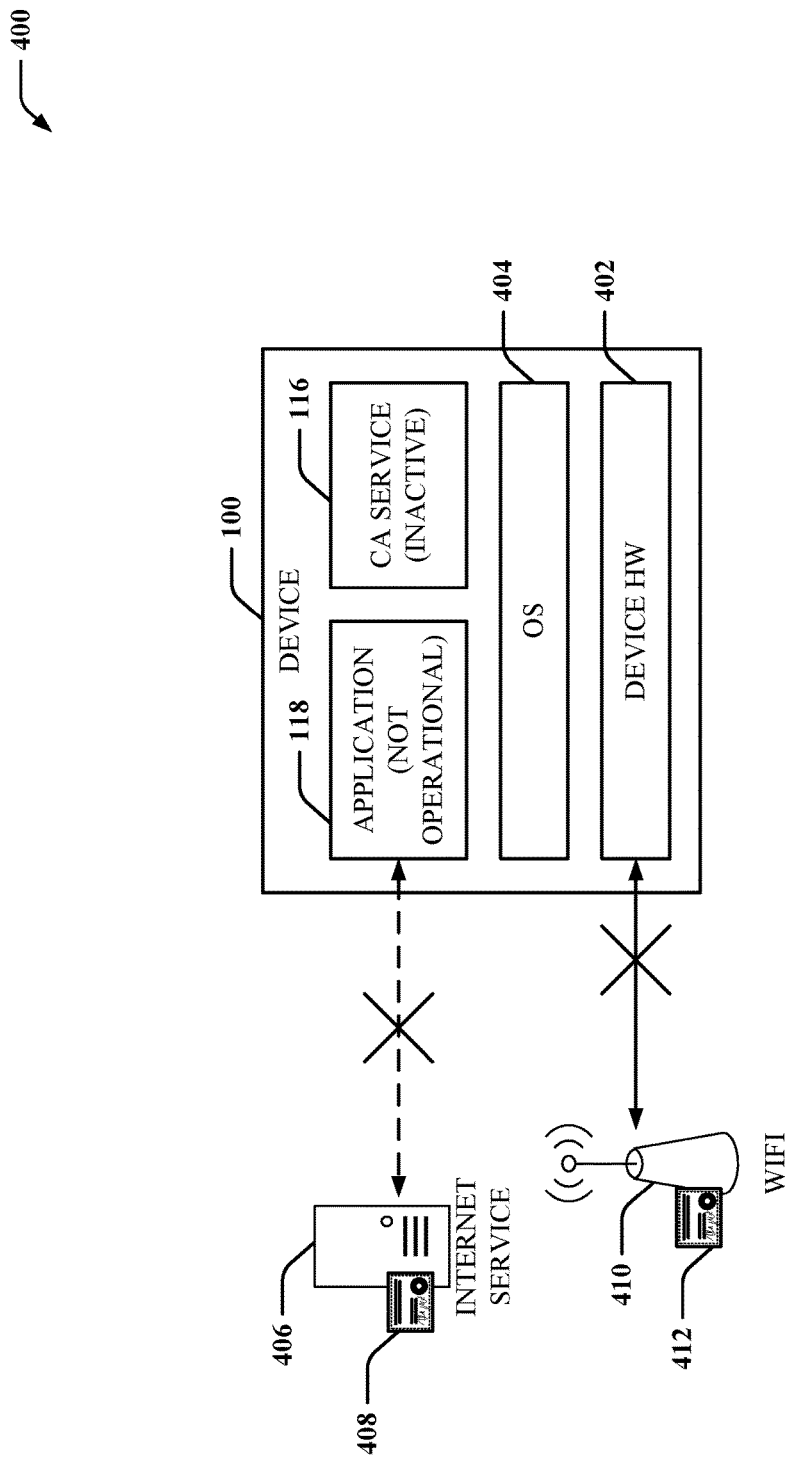
FIG. 4 is a schematic diagram of an example of a device in a state where a digital certificate has not been generated.
Figure 5:
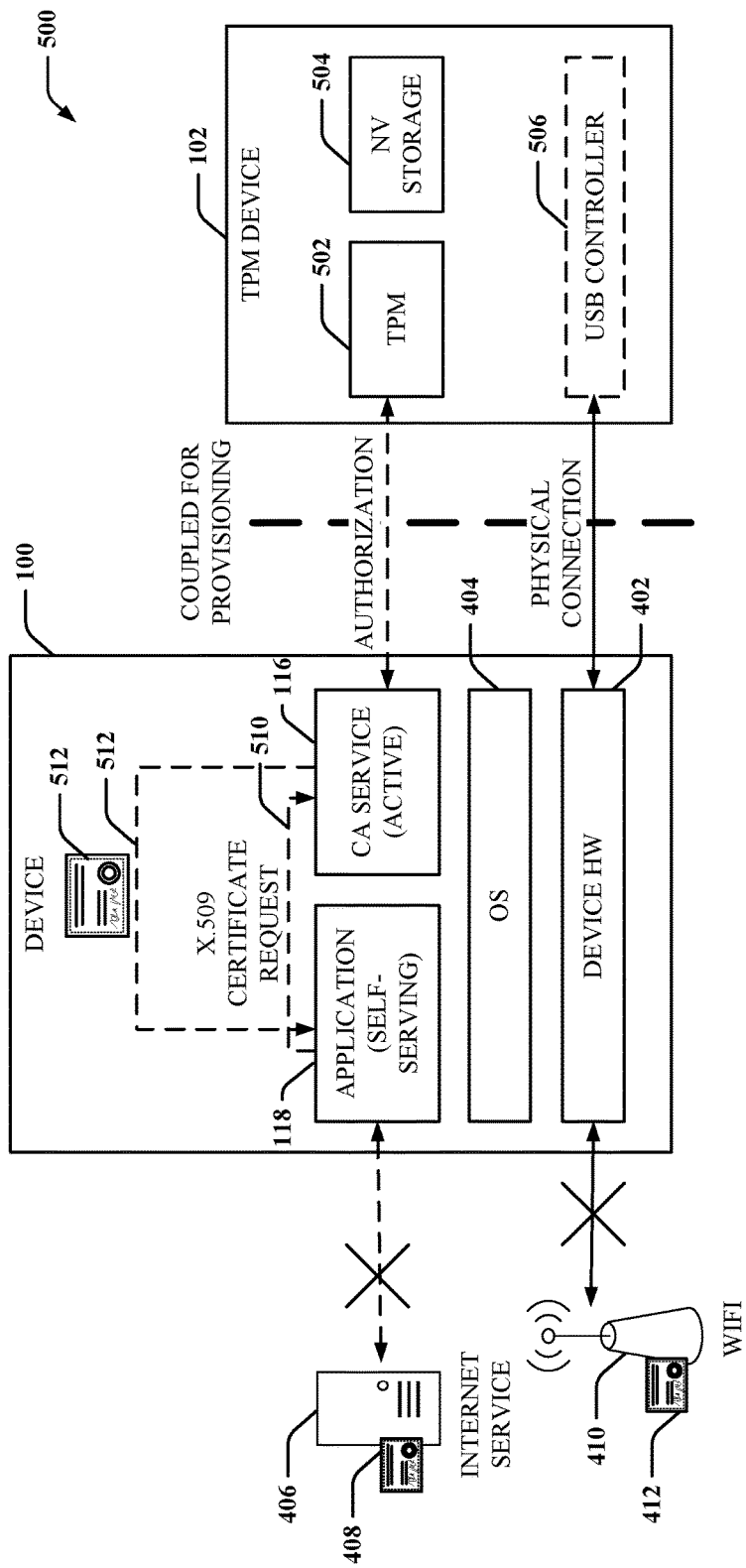
FIG. 5 is a schematic diagram of an example of a device in a state where a digital certificate is generated based on coupling with a TPM device.
Figure 6:
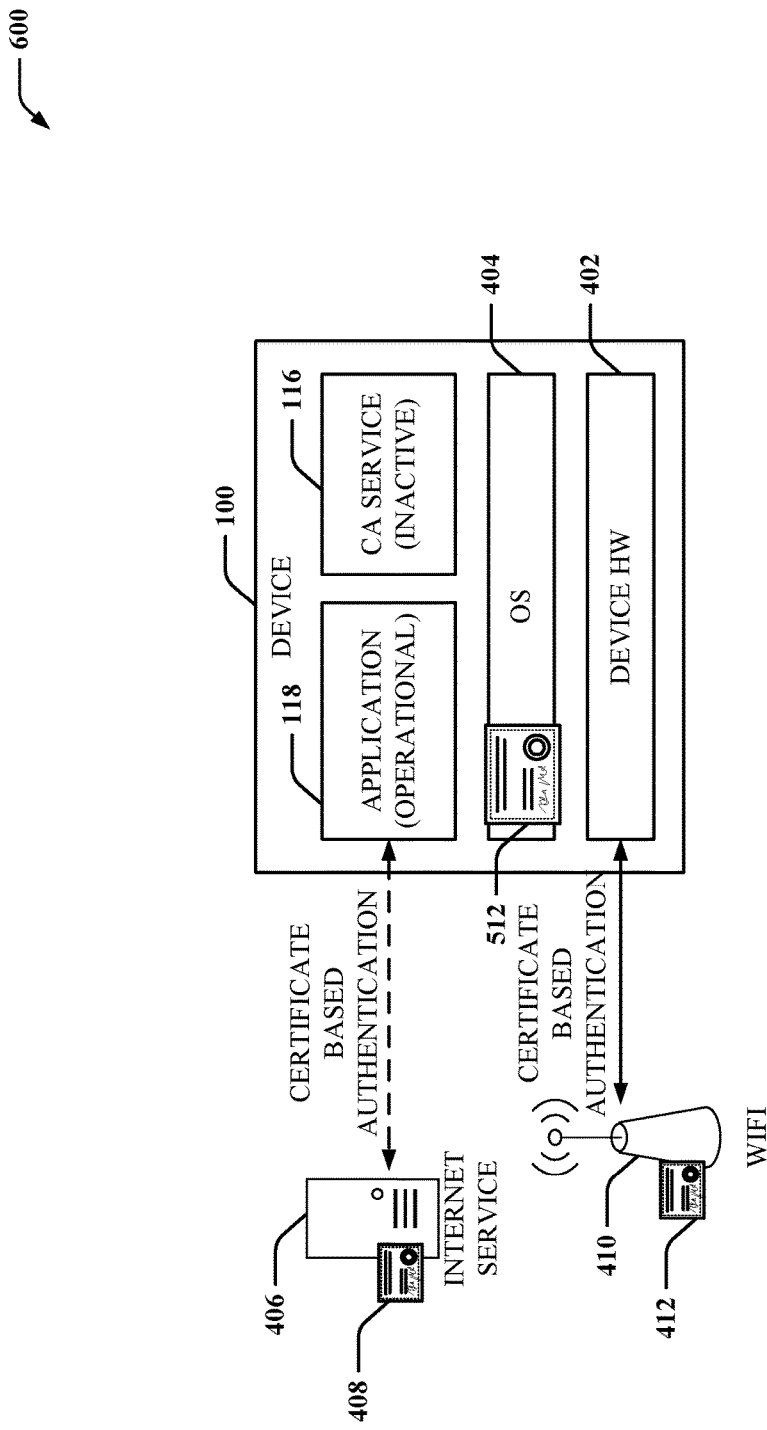
FIG. 6 is a schematic diagram of an example of a device in a state where a digital certificate has been generated and used to authenticate the device.

FIGS. 4-6 illustrate examples of systems 400, 500, 600 where device 100 is in different states based on coupling with a TPM device 102, generating digital certificates 142, etc. Systems 400, 500, 600 include a device 100 that can attempt to access an internet service 406 via a WiFi router 410. Device 100 can include device hardware (HW) 402, which may include one or more processors, memory, etc., as described, an operating system (OS) 404 that can execute on the device HW 402 to provide an operating environment for executing a CA service 116 and an application 118. In addition, internet service 406 can include one or more digital certificates 408, and/or WiFi router 410 can include one or more digital certificates 412, for authenticating devices attempting to access internet service 406 and/or (e.g., via) WiFi router 410. In a specific example, device 100 can be a home appliance or other device that is attempting to onboard on a home network, which may include WiFi router 410, to obtain access to one or more cloud-based services, which may be enabled by internet service 406 accessible via the WiFi router 410.

In FIG. 4, system 400 includes device 100 in a state where a connection has not been made with the internet service 406 (e.g., between application 118 and internet service 406) or the WiFi router 410 (e.g., between device HW 402, such as a network interface of other communication interface, and WiFi router 410). In an example, a connection established between device HW 402 and WiFi router 410 may enable a connection between application 118 and internet service 406. In addition, system 400 includes device 100 in a state where the CA service 116 is inactive (and thus not able to generate digital certificates) and where the application 118 is not operational (e.g., at least in respect to communicating with the internet service 406) based on not having a valid digital certificate to establish a connection with the internet service 406.

In FIG. 5, system 500 includes device 100 in a state where a TPM device 102 is coupled with the device 100. TPM device 102, in this example, includes a TPM 502 (e.g., a cryptoprocessor for generating or storing one or more keys, which may be based on one or more parameters of the TPM device 102 and/or a device to which TPM device 102 is coupled), a non-volatile storage 504 (e.g., a memory), and an interface, which can be a USB controller 506 in the depicted example, but could additionally or alternatively be a different type of wired or wireless communication interface, as described herein. TPM device 102 can be coupled to device 100 for performing one or more security-related functions, such as signing a digital certificate, as described. In one example, as depicted, this can include a physical connection between USB controller 506 and device HW 402, but could additionally or alternatively include a physical connection or wireless pairing between a different interface of TPM device 102 (e.g., Firewire, Bluetooth, NFC, etc.) and device HW 402 (e.g., a corresponding communication interface, processor, etc., of the device 100).

Based on coupling of the TPM device 102 to device 100, for example, TPM 502 can generate or obtain one or more keys form NV storage 504. In another example, based on coupling of the TPM device 102 to device 100, device 100 can execute CA service 116 to generate one or more digital certificates. In addition, based on the coupling and/or on receiving the one or more keys, application 118 can operate in a self-serving mode (e.g., without communicating with internet service 406) to send a X.509 certificate request 510 to CA service 116. CA service 116 can operate in an active state based on the coupling to TPM device 102. In one example, CA service 116 may indicate an active state to application 118, based on which application 118 can request the X.509 certificate. In any case, CA service 116 can generate an X.509 certificate 512, which can be a type of digital certificate 142, and can provide the X.509 certificate to TPM device 102 for signing using one or more keys from the TPM device 102. TPM device 102 can provide the signed digital certificate to the device 100.

In FIG. 6, system 600 includes device 100 in a state where the digital certificate 512 has been generated and signed by CA service 116 and TPM device 102. In this example, the TPM device 102 is no longer coupled to the device 100, and the CA service 116 is accordingly inactive. In this example, application 118 can have provided the digital certificate 512 to the OS 404 for use in authenticating with WiFi router 410. Accordingly, OS 404 can transmit the digital certificate 512 to WiFi router 410 for authenticating device 100 to communicate with WiFi router 410. WiFi router 410 can decrypt the signed digital certificate 512 to ensure the digital certificate 512 is signed with one or more keys from a trusted source, and can store digital certificate 512 with digital certificates 412 for subsequently authenticating device 100 to use the WiFi router 410. In addition, for example, application 118 can transmit the digital certificate 512, or another digital certificate, to internet service 406 (e.g., over the established connection with WiFi router 410) to establish a connection with the internet service 406. Internet service 406 can similarly verify that the digital certificate 512 is signed by one or more keys from a trusted source, and can store the digital certificate 512 with digital certificates 408 to subsequently authenticate access attempts from device 100.

Figure 7:
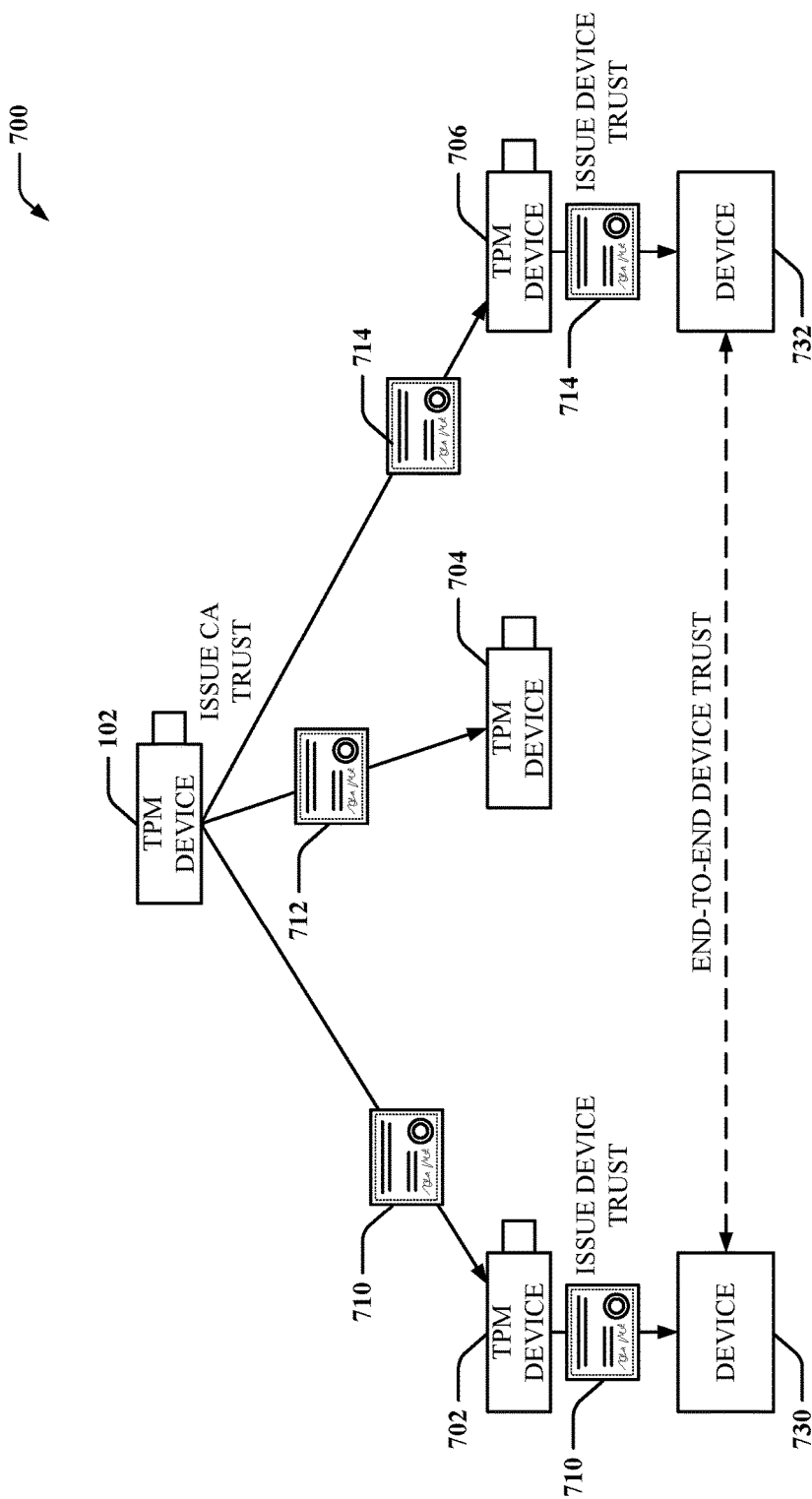
FIG. 7 is a schematic diagram of an example of a hierarchy of TPM devices and associated signing of digital certificates.

FIG. 7 illustrates an example of a hierarchy 700 of TPM devices 102, 702, 704, 706 that can be used to sign generated digital certificates. For example, TPM device 102 can facilitate signing one or more digital certificates 710, 712, 714 by another device (e.g., device 100) for providing to TPM devices 702, 704, 706, respectively, to issue an initial CA trust to TPM devices 702, 704, 706. In this example, the device (e.g., device 100) can be coupled to TPM device 102 and one or more of TPM devices 702, 704, 706, and can generate, sign, and provide the digital certificate(s) 710, 712, 714, as described above with respect to digital certificate 142. A device 730 can then couple to TPM device 702, and a device 732 can couple to TPM device 706, to respectively receive digital certificates 710, 714. Devices 730, 732 can utilize TPM devices 702, 706 to respectively generate additional digital certificates, respectively based on digital certificates 710, 714. Devices 730, 732 can use the generated digital certificates to authenticate with one or more other devices and/or with each other in an end-to-end device trust. In any case, a device 732 receiving the digital certificate 710 can authenticate the device 730 issuing the digital certificate 710, and/or a device 730 receiving the digital certificate 714 can authenticate the device 732 issuing the digital certificate 714, based on determining that the digital certificates 710, 714 are associated with the same initial CA trust of TPM device 102. For example, devices 730, 732 can determine that the digital certificates 710, 714 are signed by the same key from TPM device 102, and can accordingly authenticate communication with the other device 732, 730.

Figure 8:
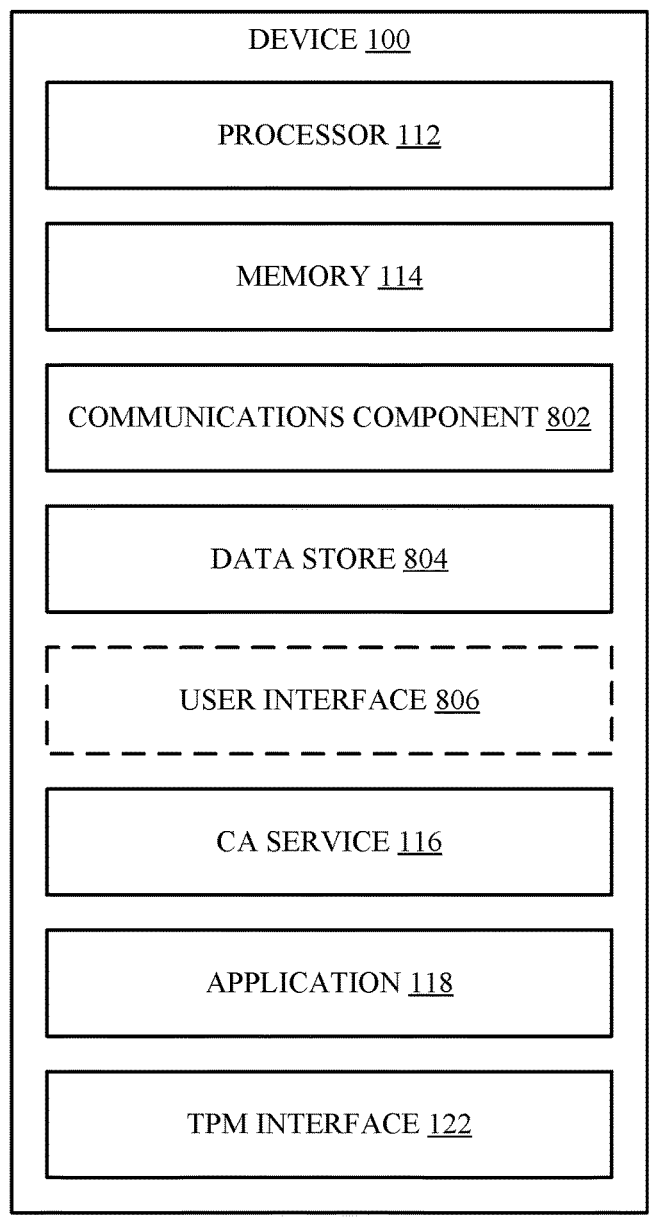
FIG. 8 is a schematic diagram of an example of a device for performing functions described herein.

FIG. 8 illustrates an example of device 100 including additional optional component details as those shown in FIG. 1. In one aspect, device 100 may include processor 112 for carrying out processing functions associated with one or more of components and functions described herein. Processor 112 can include a single or multiple set of processors or multi-core processors. Moreover, processor 112 can be implemented as an integrated processing system and/or a distributed processing system.

Device 100 may further include memory 114, such as for storing local versions of applications being executed by processor 112, such as CA service 116, application 118, related instructions, parameters, etc. Memory 114 can include a type of memory usable by a computer, such as random access memory (RAM), read only memory (ROM), tapes, magnetic discs, optical discs, volatile memory, non-volatile memory, and any combination thereof.

Further, device 100 may include a communications component 802 that provides for establishing and maintaining communications with one or more other devices, parties, entities, etc. utilizing hardware, software, and services as described herein. Communications component 802 may carry communications between components on device 100, as well as between device 100 and external devices, such as devices located across a communications network and/or devices serially or locally connected to device 100. For example, communications component 802 may include one or more buses, and may further include transmit chain components and receive chain components associated with a wireless or wired transmitter and receiver, respectively, operable for interfacing with external devices. Moreover, communications component 802 can provide or include a communication interface 120.

Additionally, device 100 may include a data store 804, which can be any suitable combination of hardware and/or software, that provides for mass storage of information, databases, and programs employed in connection with aspects described herein. For example, data store 804 may be or may include a data repository for applications and/or related parameters (e.g., CA service 116, application 118, etc.) not currently being executed by processor 112. In addition, data store 804 may be a data repository for CA service 116, application 118, and/or one or more other components of the device 100.

Device 100 may optionally include a user interface component 806 operable to receive inputs from a user of device 100 and further operable to generate outputs for presentation to the user. User interface component 806 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 806 may include one or more output devices, including but not limited to a display, a speaker, a haptic feedback mechanism, a printer, any other mechanism capable of presenting an output to a user, or any combination thereof.

Device 100 may additionally include a CA service 116, application 118, etc., as described, for obtaining one or more keys from a TPM device, generating one or more digital certificates, signing the one or more digital certificates with the one or more keys, etc. In addition, processor 112 can execute CA service 116, application 118, etc., and memory 114 or data store 804 can store related instructions, parameters, etc., as described.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A device, comprising:
  a memory storing one or more parameters or instructions for executing a certificate authority service;
  an interface configured to communicate with a removably connectable trusted platform module (TPM) device; and
  at least one processor coupled to the memory and the interface, wherein the at least one processor is configured to:
    detect an event corresponding to communications with the TPM device via the interface;
    execute the certificate authority service to generate, in response to detecting the event, a digital certificate for authenticating the device;
    provide, based on detecting the event and generating the digital certificate, the digital certificate to the TPM device for signing;
    obtain the digital certificate, as signed, from the TPM device; and
    transmit the digital certificate, as signed, to one or more other devices to authenticate the device in communicating in a network.

2. The device of claim 1, wherein the interface comprises a wired interface, wherein the event comprises insertion of the TPM device into the wired interface.

3. The device of claim 1, wherein the interface comprises a wireless interface, and wherein the event comprises pairing of the TPM device with the device via the wireless interface.

4. The device of claim 1, wherein the event comprises activation of a switch on the device.

5. The device of claim 1, wherein the one or more other devices includes a router configured to provide the device with access to a network, wherein the at least one processor is further configured to receive an indication of authentication from the router based at least in part on the digital certificate.

6. The device of claim 1, wherein the one or more other devices includes a cloud-based services node, wherein the at least one processor is further configured to receive an indication of authentication from the cloud-based services node based at least in part on the digital certificate.

7. The device of claim 1, wherein the one or more other devices includes a node in a local area network corresponding to the device, wherein the at least one processor is further configured to receive an indication of authentication from the node for communications based at least in part on a comparison of the digital certificate to a different digital certificate of the node.

8. The device of claim 1, wherein the at least one processor is further configured to:
  detect a termination event related to terminating the communications with the TPM device via the interface; and
  terminate the certificate authority service based at least in part on detecting the termination event.

9. The device of claim 1, wherein the at least one processor is further configured to transmit one or more other parameters related to the digital certificate to the TPM device via the interface.

10. The device of claim 1, wherein the at least one processor is further configured to receive one or more certificate templates of certificates that may be generated using the TPM device, wherein generating the digital certificate is based at least in part on determining whether the one or more certificate templates are supported by the certificate authority service.

11. A method for authenticating a device, comprising:
  detecting an event related to communications with a removably connectable trusted platform module (TPM) device;
  executing a certificate authority service to generate, in response to detecting the event, a digital certificate;
  providing, based on detecting the event and generating the digital certificate, the digital certificate to the TPM device for signing;
  receiving, based on providing the digital certificate to the TPM device for signing, the digital certificate, as signed, from the TPM device; and
  transmitting the digital certificate, as signed, to one or more other devices to authenticate the device in communicating in a network.

12. The method of claim 11, wherein detecting the event corresponds to detecting insertion of the TPM device into an interface.

13. The method of claim 11, wherein detecting the event corresponds to detecting pairing of the TPM device using a wireless interface.

14. The method of claim 11, wherein detecting the event corresponds to activation of a switch.

15. The method of claim 11, wherein the one or more other devices includes at least one of a router configured to provide access to a network or a cloud-based services node, and further comprising receiving an indication of authentication from the router or the cloud-based services node based at least in part on the digital certificate.

16. The method of claim 11, wherein the one or more other devices includes a node in a local area network, and further comprising receiving an indication of authentication from the node for communications based at least in part on a comparison of the digital certificate to a different digital certificate of the node.

17. The method of claim 11, further comprising:
  detecting a termination event related to terminating the communications with the TPM device via an interface; and
  terminating the certificate authority service based at least in part on detecting the termination event.

18. The method of claim 11, further comprising transmitting one or more parameters related to the digital certificate to the TPM device via an interface.

19. The method of claim 11, further comprising receiving one or more certificate templates of certificates that may be generated using the TPM device, wherein generating the digital certificate is based at least in part on determining whether the one or more certificate templates are supported by the certificate authority service.

20. A non-transitory computer-readable medium comprising code for authenticating a device, the code comprising:
  code for detecting an event related to communications with a trusted platform module (TPM) device;
  code for executing a certificate authority service to generate, in response to detecting the event, a digital certificate;
  code for providing, based on detecting the event and generating the digital certificate, the digital certificate to the TPM device for signing;
  code for receiving, based on providing the digital certificate to the TPM device for signing, the digital certificate, as signed, from the TPM device; and
  code for transmitting the digital certificate, as signed, to one or more other devices to authenticate the device in communicating in a network.

* * * * *